United States Patent Office 3,463,730
Patented Aug. 26, 1969

3,463,730
PREVENTION OF AND REMOVAL OF SCALE FORMATION IN WATER SYSTEMS
Robert Ben Booth, Stamford, and Linda Clarendon Mead, Greenwich, Conn., assignors to American Cyanamid Company, Stamford, Conn., a corporation of Maine
No Drawing. Filed Aug. 5, 1965, Ser. No. 477,604
Int. Cl. C02b 1/20
U.S. Cl. 210—58                                                                 15 Claims

ABSTRACT OF THE DISCLOSURE

Formation of hard adherent scale deposits of insoluble salts particularly carbonates and sulfates of metals such as calcium or other alkaline earth metals, and/or iron which may include particles of silt or silica, are inhibited, controlled or prevented on, or removed from (a) the walls of evaporators, cooling towers, heat exchangers, boilers and devices where a thermal gradient exists or areas where catalytically active sites induce scale formation in aqueous systems by (b) from about ¼ to 100 parts per million of a hydrolyzed polyacrylamide having (c) from about 10% to 50% unhydrolyzed amide groups and (d) a molecular weight of about 1,000 to 8,000. The polymer is useful alone, and in cooperation with other sequestrants and chelating agents.

---

This invention relates to a process of controlling or preventing the formation of adherent deposits of salts from water, particularly during distillation, evaporation heat exchanging processes, filtration, flow, circulation and transportation and storage, by the use of a small but effective amount of a hydrolyzed polyacrylamide having from about 10% to about 50% of unhydrolyzed amide groups and a molecular weight of about 1,000 to about 8,000; and to a composition containing such polymer.

More particularly, the invention relates to the process of preventing the formation of hard adherent scales or deposits on containing vessels, which scales are at least in part composed of the compounds of the alkaline earths or iron, from aqueous solutions in such vessels; including such deposits which have in their structure silt or sediment particles of silica or clay or other materials which are basically insoluble in water but are locked into place in a matrix composed of the alkaline earth or iron compounds.

In a broad sense the invention relates to the control of the characteristics of formation of adherent deposits of both comparatively soluble and comparatively insoluble salts. The control of insoluble salts, especially calcium carbonate, and also calcium sulfate, is the most important and broadest teaching. Incipient deposits to be controlled may be regarded as (a) temperature induced precipitates as, for example, in heat exchangers and boilers where a thermal gradient exists which tends to increase the rate of deposition; (b) surface-modified deposition in which the surface has active centers which appear to catalytically control the rate of attainment of equilibria and, hence, induce the rapid deposition of insoluble deposits (this phenomena is particularly of interest in filter media where there is a comparatively large surface as well as pipes and other vessels in which there is some agitation); (c) incrustations in which finely-divided silica or clay particles are incorporated in deposits on surfaces, thereby both increasing the rate of build-up and the hardness of the deposit while rendering such deposit more resistant to either mechanical or chemical attack; (d) precipitation induced by a change in conditions such as the pH or concentration of one of the components or by evaporation of water to increase concentrations. Scale formation is increased by a drift in the pH toward such a range in which a component is less soluble, or a change in concentration as, for example, absorption of the carbon dioxide from the air in cooling towers, which additional carbon dioxide by the law of mass action tends to precipitate out with calcium as a calcium carbonate. These phenomena are not necessarily completely independent as more than one of them may be contributing toward the production of deposits. Deposition may occur from a system in equilibrium in which a change in conditions causes a component to become insoluble or it may occur in a metastable system where calcium carbonate, for example, is present in a supersaturated solution, and which system is seeking but has not yet reached equilibrium.

The problem of scale formation has its largest application where there are interfacial problems involved. Of particular importance are boilers, pipe lines, heat exchangers, and other thermal transfer equipment made of metal, particularly carbon steel. The surface of steel appears to be peculiarly susceptible to and perhaps even might be considered catalytic in promoting scale formation. The results in the present invention are consistent with the theory that a thin monomolecular layer of the low molecular weight polyelectrolyte forms on steel or other surface, or at least the more active centers, and protects the surface, or at least alters the interfacial relationship between the surface and the scale forming elements, so that the tendency of scale to adhere is markedly reduced; and, additionally, the crystal characteristics of precipitating hardness, such as carbonates and sulfates of calcium, are so altered that the crystals are smaller, poorly formed and more easily removed with less of a tendency to adhere than in the absence of the low molecular weight polyelectrolyte.

Another area of major importance is in filtration. Filter media, which may be fiber filter cloths, steel filter cloths, cellulose paper, glass cloth, or synthetic fibers such as nylon or polyester filters, or other filter material, appear to have active centers or some type of sites which tend to increase the tendency of the carbonates and/or sulfates of calcium to precipitate on such filter surfaces, clogging and blinding the filter surfaces, thus reducing the filtering rate and requiring that the filter surface be changed, cleaned, or that it be treated with an acid to react chemically with and remove the scale formed. As is common in many heterogenous reaction mechanisms, the theory and proof of theory is either ambiguous or difficult because the actual areas involved and the mass present at the area at a given time is such a small fraction of the total mass present.

The alkaline carbonates and/or sulfates appear to come out as hard dense crystals on solid surfaces. In the presence of the present polymer, the precipitates are finer and more irregular.

The problem of scale formation is a very serious one, both for domestic water supplies, where plumbing is gradually plugged up, and also for steam boilers, where formation of scale in the boiler tubes is a serious matter and once deposited is difficult to remove.

This problem is aggravated, particularly in certain industrial operations such as cooling operations, where waters containing salts, mineral matter, slimes and other sediments even in small quantities are the only waters economically available. In such cases, the alkaline earth compounds which deposit out of the waters tend to cement together the silt or sediment particles as a strongly adherent scale or concretion which causes blockage of and interferes with water flow in industrial processing such as cooling, heat exchanging, filtering, evaporation, air-conditioning and the like.

The present invention prevents the formation of hard adherent scale by adding small amounts of a hydrolyzed polyacrylamide having from 10% to 50% unhydrolyzed amide groups, and preferably from about 20% to about 40%.

In addition to the proportion of amide groups, there is a very vital and critical limitation on molecular weight which must be well below 10,000 and should be from 1,000 to 8,000, preferably 4,000 to 7,000. This is a vital and essential feature of the invention, as high molecular weight hydrolyzed polyacrylamide results in flocculation rather than the prevention of scale formation. Different theories are propounded to explain the very different results obtained with the low molecular weight hydrolyzed polyacrylamides of the present invention. Such theory is in part set forth herein, but the invention is not predicated upon such theories. Importantly, scale formation is greatly reduced, the amount of alkaline earth metal salts remaining in solution is higher and, importantly, the precipitates which do form are light and amorphous and are readily removed; whereas in the absence of the hydrolyzed low molecular weight polyacrylamides, hard, adherent, crystalline scale deposits result which can only be removed from walls of vessels by vigorous scrubbing or other abrasion procedures or chemicals too corrosive for routine use.

An unhydrolyzed polyacrylamide of the same molecular weight is not nearly as satisfactory as a scale inhibitor or antiprecipitant or crystal habit modifier.

Even though at least 50% of the amide groups are hydrolyzed, the designation low molecular weight hydrolyzed polyacrylamide is chosen because it fits in well with current trade usage and is descriptive and distinguishing. The polymer can properly be termed a polycarboxyethylene-polycarbamylethylene long chain carbon-to-carbon polymer. It is a polyelectrolyte. In the acid form the polymer has the probable formula:

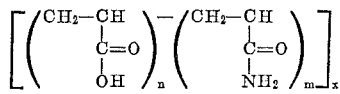

where $n$ and $m$ are whole numbers, such that $n$ is at least about as large as $m$, and not more than about 9 times as large as $m$, and $n$ and $m$ and $x$ have such size that the total molecular weight is between 1,000 and 8,000, preferably between 4,000 and 7,000, and the two groups may occur in random order and orientation.

From polymerization theory one end of the chain in polymerization is a free radical, with which the vinyl group of a monomer molecule reacts. The high catalyst ratio permits a theory that sulfonate groups are formed on the end of, and terminate chain growth. This causes the relatively low molecular weight. This is consistent with the theory that the sulfonate groups are themselves reactive with calcium and barium ions, and hence alter the reactivity in crystal growth. The relatively low polymer weight permits the relative number of sulfonate groups to make a greater contribution.

Frequently and conveniently the polymer is added as an alkali metal salt, usually the sodium salt. Potassium, ammonium or other soluble salts may be used, and all of the acidic hydrogens need not be replaced, nor of those replaced need the cation be the same. As the polymer is used in dilute solution, and the cation, be it alkali metal or hydrogen, etc., is dissociated to an extent that varies with the concentration of other cations present, the polymer at the time of action can be considered in a transient state, and for purposes of convenience, the name of the acid form is used for identification without the intention that the polymer be in such acid form. Also, small numbers of nitriloethylene linkages, from acrylonitrile, or other vinyl compounds may be in the chain without deleteriously affecting the action, and in such minor quantities that positive identification of their presence or absence is difficult.

One of the big advantages of the present invention is that the polymers can be prepared from technical grade components, and the final polymer may in part be used as a dry powder added when desired, or as an aqueous solution, or as a powder or solution containing the residues from catalyst systems, or organic or inorganic salts, compounds and impurities inherently present in the starting materials from components used in synthesis. The low requirements for process purity of the polymer permits grades of acrylamide or acrylonitrile, or acrylic acid and its salts, to be used in synthesis that are less pure than required for fiber formation, or high molecular weight polymers, thus conferring a distinct commercial advantage in synthesis. These monomers in high grade or purified form may be utilized as starting materials, if economically available. The hydrolyzed polyacrylamide can be prepared by first polymerizing acrylamide and then hydrolyzing some of the amide groups, or concurrent polymerization and hydrolysis or it may be made by other means, including copolymerization of acrylic acid and acrylamide, or hydrolysis of polyacrylonitrile, etc. In any event, there are the proper proportions of amide groups and the remainder being carboxyl groups, usually in the form of an alkali metal salt. The term hydrolyzed polyacrylamide is used as convenient understandable terminology rather than to limit the process of manufacture.

High molecular weight polyelectrolytes, that is polymers from about 10,000 up, and for best results in the range of 100,000 to 20,000,000 have been used as flocculants. As flocculants, one theory is that one part of the long polymer chain attaches to one solid particle and another part attaches to another particle, which holds the particles together forming flocs, almost like grapes in a bunch. The phenomena of fluocculation is markedly different from the prevention of adherence of deposits of the present invention and the same polymer at the same molecular weight cannot be optimum for both. The present low molecular weight hydrolyzed polyacrylamide acts in part as a dispersant or deflocculant, a diametrically opposed objective from that of the higher molecular weight polyelectrolytes used as flocculants.

The present problem of scale inhibition and preventing the formation of solid deposits, primarily of calcium and which may have other insoluble materials in the matrix, has certain theoretical concepts which may involve chelation, sequestration, antiprecipitation and antinucleation as well as dispersion and the modification of crystal structure. These concepts are both chemical and physical and involve the action of additives with stoichiometric equivalents of the compounds in solution or greater than stoichiometric quantities, and the inhibition of neucleation or inactivation of nuclei to prevent precipitation or to slow down precipitation long enough to permit a processing operation to take place. The dispersion of suspended solids or of precipitated solids is likewise a significant factor. The modification of crystal structure and the formation of non-adherent deposits plays an important role. These phenomena, singly or in partial and total combination and cooperation and interaction probably account for the action of the low molecular weight hydrolyzed polyacrylamide herein described. It is obvious that even a theoretical expanation is difficult to provide because the complexity of the factors involved and their probable interaction.

Uniquely, the low molecular weight hydrolyzed polyacrylamide is advantageously present with added soluble inorganic salts which enhance the action of these polymers by improving their dispersing properties. The desirability of the presence of such salts, particularly sodium sulfate has an added and unexpected economic advantage. The low molecular weight polymers of the present invention are economically produced by polymerizing acrylamide with redox catalysts such as a mixture of sodium metabisulfite and sodium persulfate at a comparatively high catalyst usage. About 5% of the catalyst by weight of the monomer gives extremely rapid polymerization and chain termination to result in lower molecular weight polymers. The residues after the interaction of the components of the redox catalyst, as well as any residual sodium sulfate which may have been present with the monomer is desirably retained with the polymer. The polyacrylamide is conveniently hydrolyzed with caustic, such as sodium hydroxide, and again residual caustic can conveniently be left with the polymer after it has been hydrolyzed so as to leave from about 50% to about 10% amide groups on the chain. Fortunately and fortuitously, the catalyst system is such that even less purified grades of polyacrylamide may be used in the production and, hence, a final product is obtained which may have at least 20% to 30% of sodium sulfate and/or sodium chloride and/or caustic present. Such salt containing low molecular weight hydrolized polyacrylamide operates not only with maximum efficiency as compared with a pure polymer, but in many instances even with improved results, so that the unique and highly unexpected result is obtained with a more economical product, which not only does not require purification, but actually in some systems is more effective than if purified.

The partially hydrolyzed polyacrylamide with a molecular weight of 1,000 to 8,000 is water soluble. It is readily soluble to the extent of at least 25% at room temperature. The polymer may be added dry, and permitted to dissolve during use. Solution is so rapid that only sufficient agitation is required to cause uniform mixing, and yet any amount of agitation is not deleterious. Alternatively, the polymer can be dissolved in water and added as 0.1% to 25% solution for operations in which liquid feeding is more convenient and, in fact, may be used as a synthesis mixture without drying where logistics are such that this procedure is most economical.

This ease of addition is in marked contrast to the high molecular weight polyacrylamides and polyacrylamide hydrolytes used for flocculation which require much time and care to dissolve the polymer without the production of "gel clots" and which polymer must be added as a dilute solution—frequently less than one-half of 1% in order that the viscosity be low enough for convenience in handling as a liquid. For flocculation, agitation is often kept to a minimum, to avoid degradation of the polymer.

The present hydrolyzed low molecular weight polyacrylamide in one specific embodiment is a dry light cream colored solid having a molecular weight of 6,000, a polymer content of 75%, with the polymer being 75% carboxyl and 25% amide, and the diluents being primarily sodium and ammonium sulfates and sodium hydroxide. The pH of a 1% solution is 10.8 and of a 10% solution 12.1. The viscosity at 1% solution is 1.3 centipoises and the solubility is over 25% in solutions having a useful viscosity, that is thin enough to be added and readily dispersed. If the point of use is close to the point of manufacture the polymer can be moved by pipe line or as a liquid. For greater distances, or for long-term storage, the product is drum dried. Not all of the known useful properties of the material are here claimed as the material is known to be useful as a drilling mud additive, as a sequestrant, a descalant, a boiler water additive, an additive in the electrodeposition of metals, and in heating and air-conditioning equipment, both in circuits which are exposed to the air and, therefore, subject to absorb carbon dioxide, and in closed systems where the absorption of carbon dioxide is not a problem. It is useful in the evaporation and desalting of sea water, as well as various other brines and is useful in controlling scales and encrustations and a wide variety of chemical processing, including treating hard water, to assist in the control of scale and deposits which are independent of or induced by added chemicals in processing equipment and machinery such as tanks, pipes, pumps, filters, filter media, as a detergent for use with or independent of other detergents and surfactants; in metal cleaning, the processing of ores, including flotation, cyanidation, filtration, etc. It may be used to assist in dispersing mineral products as may be desired in degritting clay, classification of clay fractions, classification of other minerals such as asbestos, and processing sewage and industrial wastes and as a dispersant for pigments, fillers, carbon blacks, paper coatings, and in conjunction with other sequestrants, chelating agents, or antinucleating agents in chemical processing or heat exchange or paper making.

Concurrent usage with other additives

The present low molecular weight hydrolyzed polyacrylamide is not only effective in its own right as an antiprecipitant, sequestrant and chelating agent, but also is effectively blended with conventional agents used for such purpose with advantage. Among the chelating agents and sequestrants and antiprecipitants which may be used advantageously in combination with the low molecular weight hydrolyzed polyacrylamide are:

Ethylenediamine tetraacetic acid
Nitrilotrisacetic acid
Hydroxyethylethylene diamine triacetic acid
Trisodium bis(1-carboxy-1-hydroxyethyl)phosphinic acid
Sodium N,N-bis(2-hydroxyethyl)glycinate
Lignin compounds, including sulfonates
Polyphosphates
Inorganic polyacids, e.g., polymolybdates and polytungstates
Polysaccharides
Citric acid
Glutamic acid
Heptagluconic acid
Tannic acids
Salts of the above compounds Other sequestrants which give other useful compounds in combination are set forth in conventional texts, such as: Mantel and Calvin, "Chemistry of the Metal Chelate Compounds," Prentice Hall, New York (1953), and Bailar, "The Chemistry of the Coordination Compounds," Reinhold Publishing Corp., New York (1956).

The present low molecular weight hydrolyzed polyacrylamide is also useful in conjunction with acids or bases used for cleaning deposits from pipes, vessels, tanks, radiators, pipe lines, watermains, sewage lines, and other locations where deposits already formed, either from calcium carbonate alone, or in conjunction with silt and/or other salts are already in place, and mud removal. The present low molecular weight hydrolyzed polyacrylamide is useful alone in loosening and removing such deposits, and aids in solvent, detergent or acid or base attack because once particles are loosened, the polymer tends to keep them suspended.

From common ion effect, and solubility product theory, in thermodynamically stable systems, it is obvious that a more efficient scavenging of calcium is required where a high carbonate or sulfate concentration is present. In cooling towers, and aerated systems, such concentrations cannot be conveniently reduced, and hence, the highly efficient present concepts of calcium inactivation are more important than in systems where lime may be high, but low carbonate concentration prevents calcium carbonate build-up.

It should be noted that the hydrolyzed polyacrylamide of the present invention does not act purely as a sequestrant, although this phenomena may be present. The drastic change in the nature of any precipitates which form on the walls of vessels or pipes is not purely a sequestration phenomenon. It is not known exactly what mechanism produces the new effect. Accordingly, the invention is not limited to any theory of action, and any statement of theory is to assist in understanding the invention, not limit the invention.

The low molecular weight hydrolyzed polyacrylamides of the present invention are especially useful in the treatment of water containing silts, mineral matter, slimes and other sediments, including such waters from natural sources, by-product and reused waters from industrial processing operations, and also domestic and industrial waste waters. The solids in such waters tend to settle out to coat containing vessels, clog pipes, and decrease the efficiency of heat exchangers, radiators of various types, evaporators, boilers, automobile cooling systems and other cooling equipment. In hard waters, this problem is aggravated by the deposits and encrustations of alkaline earth metal compounds and salts which also form and act as cementing materials for deposited mineral matter. Calcium carbonate and sulfate are one of the most common components. Removal of the combined agglomerate is difficult and costly. The use of the low molecular weight hydrolyzed polyacrylamides of the present invention provides a solution of the problem of handling such waters. These polymers are dispersants and keep fine solids in suspension, thus preventing their sedimentation to form hard adherent deposits. These polymers also prevent the formation of hard deposits by keeping alkaline earth metal compounds in solution as described above. Thus the use of these polymers eliminates the formation of agglomerates composed of the settled solid materials combined with the deposits of alkaline earth compounds and solves the difficult problems involved in utilizing silt-containing hard waters.

In quantitative dispersing tests on samples of clays and limonite, hematite, coal, slate, limestone, and other mineral and ore slimes, the hydrolyzed polyacrylamides herein described have been found to be more efficient dispersants than polyphosphates, lignin sulfonates, and sodium silicate, frequently being 3 to 15 times more effective.

The low molecular weight hydrolyzed polyacrylamides are beneficial in evaporation and distillation processes used for the treatment of salt waters, brackish waters, sea and ocean waters, brines, etc. in the recovery of water and concentration of valuable components. Without the polymer, the salt deposits from such treatments form hard and difficulty removable deposits on heating coils and heated surfaces. The use of a fractional part to a few parts per million of the polymers of the present invention in the desalting of water by evaporation produces salt deposits which are readily removed from heating coils by simple brushing operations, and often the force of flowing water is sufficient to render such deposits self-cleaning.

The invention will also be described in conjunction with the specific examples, in which the parts are by weight unless otherwise specified. Molecular weights are weight average molecular weights for polymers.

Example 1.—Calcium carbonate sequestration vs. tripolyphosphate

Two water solutions were prepared: one containing 0.04% calcium hydroxide and the second 0.05% sodium bicarbonate. 250 ml. samples of the first solution were prepared, to which were added varying amounts of the sodium salt of hydrolyzed polyacrylamide of about 6,000 molecular weight containing about 30% unhydrolyzed amide groups. The amounts ran from 0.75 to 10 p.p.m. To each sample of the first solution was added an equal volume of the second solution, and the combined solutions permitted to stand for one hour. The pH was 11.5. The system was then filtered to collect the precipitate which formed.

To a second set of samples of the first solution there were added corresponding amounts of sodium tripolyphosphate. An equal volume of the second solution was added. These mixed solutions were also permitted to stand for the same time, followed by filtration to collect the precipitate which formed. A control test was run in which the solutions were mixed, but no hydrolyzed polyacrylamide was present. The nature of the precipitates was quite different. Those samples which received varying amounts of the hydrolyzed polyacrylamide showed calcium carbonate precipitates which were light, amorphous and free-flowing instead of the dense, crystalline, adherent properties formed in the control tests. The light, amorphous products were readily removed from the vessels, whereas the control samples produced precipitates which adhered strongly to the walls and bottom of the container and were dislodged only by vigorous scrubbing. The containers were glass beakers.

Each precipitate was analyzed for calcium content by dissolving in 6 N hydrochloric acid followed by titrating the calcium with ethylene diamine tetraacetic acid. This was compared with the control solution to which neither hydrolyzed polyacrylamide nor sodium tripolyphosphate had been added, and the carbonate held in solution was determined as the difference between that found in the control and that found in each of the precipitates of the treated solutions.

Experimental results show:

CALCIUM CARBONATE HELD IN SOLUTION

| Low Molecular Weight Hydrolyzed Polyacrylamide | | Sodium Tripolyphosphate | |
| --- | --- | --- | --- |
| P.p.m. Polymer Added | P.p.m. Calcium Carbonate held in Solution | P.p.m. Polyphosphate Added | P.p.m. Calcium Carbonate Held in Solution |
| 0 | 0 | 0 | 0 |
| 0.75 | 128 | 1 | 70 |
| 3.75 | 187 | 5 | 152 |
| 7.00 | 235 | 10 | 156 |

It will be noted that the hydrolyzed polyacrylamide at all concentrations, even though lower in dosage levels than the sodium tripolyphosphate, held more calcium carbonate in solution. The tripolyphosphate apparently reached a plateau of effectiveness at about 5 p.p.m. whereas the hydrolyzed polyacrylamide showed increased efficiency at 7 p.p.m. and beyond.

Example 2.—Calcium carbonate precipitation control—degree of hydrolysis

Two solutions were prepared, Solution I containing 0.04% CaO and Solution II containing 0.05% $NaHCO_3$. To a 250 ml. aliquot of Solution I, hydrolyzed polyacrylamides and a polyacrylic acid were added in concentrations ranging from 0.75 p.p.m. to 2.0 p.p.m. in a series of separate tests. A 250 ml. aliquot of Solution II was then added. The resulting solution was then allowed to stand one hour and filtered. The calcium in the precipitates which were filtered off was determined by an EDTA (ethylene diamine tetraacetic acid) titration. A control was conducted similarly, except that the hydrolyzed polyacrylamides and the polyacrylic acid were omitted.

In one series of tests, a hydrolyzed polyacrylamide of 6,000 molecular weight was used and 70% of the contained amide groupings were hydrolyzed to COONa groupings. In a second series of tests, a hydrolyzed polyacrylamide of 6,000 molecular weight and 90% of the contained amide groupings were hydrolyzed to COONa groupings. The low molecular weight hydrolyzed polyacrylamide used contained about 25% $Na_2SO_4$. The table shows real polymer content. In the third series of tests, a polyacrylic acid of 23,000 molecular weight was used, as free acid.

The results of these tests are summarized in the following table:

| P.p.m. hydrolyzed polyacrylamide 70% COONa | P.p.m. calcium carbonate precipitated | P.p.m. calcium carbonate held in solution |
|---|---|---|
| 0 | 300 | |
| 0.75 | 172 | 128 |
| 1.50 | 158 | 142 |

| P.p.m. hydrolyzed polyacrylamide 90% COONa | P.p.m. calcium carbonate precipitated | P.p.m. calcium carbonate held in solution |
|---|---|---|
| 0 | 300 | |
| 0.75 | 201 | 99 |
| 1.50 | 182 | 118 |

| P.p.m. polyacrylic acid | P.p.m. calcium carbonate precipitated | P.p.m. calcium carbonate held in solution |
|---|---|---|
| 0 | 300 | |
| 1 | 251 | 49 |
| 2 | 182 | 118 |

The hydrolyzed polyacrylamide containing 70% COONa was more efficient in holding calcium carbonate in solution than the polyacrylic acid since 0.75–1.50 p.p.m. of this hydrolyzed polyacrylamide held 128–142 p.p.m. calcium carbonate in solution as compared to 49–118 p.p.m. calcium carbonate with 1–2 p.p.m. polyacrylic acid.

Also, the hydrolyzed polyacrylamide containing 90% COONa was more efficient in holding calcium carbonate in solution than the polyacrylic acid since 0.75–1.50 p.p.m. of this hydrolyzed polyacrylamide held 99–118 p.p.m. calcium carbonate in solution as compared to 49–118 p.p.m. calcium carbonate with 1–2 p.p.m. polyacrylic acid.

The low molecular weight hydrolyzed polyacrylamide causes a variation in crystal form that is readily apparent under a microscope. The crystals are smaller. Some of them even exhibit Brownian movement. Thus, they are readily dispersible and suspendable. The crystals lose their characteristic morphology, the edges become rounder, the faces smaller, anhedral rather than euhedral. The change is from flat rods and plates to more equant crystals. The crystals pack more like marbles in a bag than bricks in a wall, and hence the precipitated material is more readily removed.

Example 3

Saturated calcium sulfate solutions in water, (0.21% $CaSO_4$), were prepared. 500 ml. samples of the solution were treated with various amounts of a low molecular weight hydrolyzed polyacrylamide as described in Example 1; again the additions being from 1 to 10 p.p.m. One of the samples was used as a control, to which no hydrolyzed polyacrylamide was added. All samples were then concentrated by boiling down to a volume of about 125 ml. Precipitation of calcium sulfate, of course, occurred during the evaporation and was filtered off. The calcium sulfate content of the filtrate was then determined. The results are shown in the following table:

| Hydrolyzed polyacrylamide p.p.m.: | Percent $CaSO_4$ in solution after evaporation |
|---|---|
| 0 | 0.24 |
| 1 | 0.32 |
| 2 | 0.53 |
| 5 | 0.73 |
| 10 | 0.77 |

As in Example 1, the structure of the deposited calcium sulfate was modified by the hydrolyzed polyacrylamide. The calcium sulfate was amorphous in structure as compared to the crystalline deposit obtained in the control test. The deposits formed in the presence of the hydrolyzed polyacrylamide were readily dislodged and removed from the walls and bottom of the containing vessel, whereas in the control test a strongly adhering deposit formed, which was difficult to remove and had to be scraped or scrubbed off.

Example 4.—Delay in precipitation

To separate 100 ml. samples of an aqueous solution containing 5,000 p.p.m. of sulfate ion as sodium sulfate, 1–2 p.p.m. of low molecular weight hydrolyzed polyacrylamide, molecular weight about 6,000, about 70% hydrolyzed, were added, with one such sample as a control. To the samples water solutions of calcium chloride were added to produce calcium ion concentrations of from 2,000 to 10,000 p.p.m. The solutions were then all observed to notice the effect of hydrolyzed polyacrylamide on the formation of a precipitate of calcium sulfate. The results of the tests are shown in the following table:

| P.p.m. $Ca^{++}$ | Hydrolyzed polyacrylamide | Time (hours) before precipitation occurred |
|---|---|---|
| 2,000 | 1 | 3.25 |
| 4,000 | 1 | 3 |
| 6,000 | 1 | 2.50 |
| 8,000 | 1 | 2 |
| 4,000 | 2 | 1 |
| 6,000 | 2 | 1 |
| 8,000 | 2 | 1 |
| 10,000 | 2 | 1 |
| 2,000–10,000 | 0 | 0.25 |

Example 5

A series of precipitation observations were made in accordance with Example 4 but using solutions containing stoichiometric quantities of calcium and sulfate ions in various concentrations. The result is shown in the table:

| P.p.m. $CaSO_4$ | Hydrolyzed polyacrylamide | Time (hours) before precipitation occurred |
|---|---|---|
| 2,500 | 1 | 48 |
| 2,500 | 2 | 48 |
| 10,000 | 1 | 45 |
| 10,000 | 2 | 45 |

Example 6

The procedure of Example 5 was followed with solutions containing various amounts of barium and sulfate ions in stoichiometric amounts. The results are as given in the following table. No precipitation was observed over a two-hour period.

PARTS PER MINUTE

| $BaSO_4$ | Hydrolyzed Polyacrylamide |
|---|---|
| 10 | 1–25 |
| 50 | 1–25 |
| 100 | 1–25 |
| 250 | 1–50 |
| 500 | 5–100 |

Example 7

Samples of water containing 115 p.p.m. hardness and 10 p.p.m. of the sodium salts of hydrolyzed polyacrylamides of varying molecular weight and carboxyl content were heated on an electric hot plate. The water level in the beaker was maintained constant by the addition of water from a constant level device until 20 liters of the water were evaporated. A control test was conducted similarly except that no polymer was added to the water at the start of the evaporation.

During the evaporation, a scale deposit formed on the areas of the beaker which were heated, particularly on the bottom in contact with the electric hot plate. The deposit formed in the absence of the hydrolyzed polyacrylamide was hard and adherent, while in the presence of the hydrolyzed polyacrylamide the deposit was readily dislodged. The quantity of scale deposited in the various tests is shown in the following table:

| Mol. wt. | Percent amide groups hydrolyzed to COONa | Wt. of scale, g. |
|---|---|---|
| 8,000 | 90 | 0.109 |
| 7,000 | 90 | 0.115 |
| 5,000 | 90 | 0.104 |
| 8,000 | 80 | 0.108 |
| 6,000 | 80 | 0.110 |
| 5,000 | 80 | 0.106 |
| 8,000 | 72 | 0.112 |
| 6,000 | 72 | 0.105 |
| 5,000 | 72 | 0.101 |
| 8,000 | 60 | 0.117 |
| 6,000 | 60 | 0.121 |
| 5,000 | 60 | 0.115 |
| 6,000 | 58 | 0.126 |
| 6,000 | 53 | 0.130 |
| Control, no polymer | | 0.326 |

Example 8

Twelve liters of a Connecticut tap water were concentrated to a volume of 400 ml. by adding the water in 500-ml. stages to a vented autoclave heated and maintained at 200 pounds per square inch (gage) pressure. The solid residue remaining after this operation was fine, dense and strongly adherent to the autoclave.

Separate 12-liter samples of the same water were pretreated with various hydrolyzed polyacrylamides and similarly concentrated. The hydrolyzed polyacrylamides used are as follows:

| Mol. wt. | Percent amide groups hydrolyzed to COONa | P.p.m. added |
|---|---|---|
| 7,500 | 85 | 0.25 |
| 7,000 | 60 | 1.0 |
| 6,000 | 70 | 5.0 |
| 5,000 | 52 | 10.0 |
| 5,000 | 65 | 15.0 |
| 5,000 | 75 | 20.0 |
| 4,500 | 75 | 25.0 |
| 4,000 | 70 | 2.0 |
| 4,000 | 55 | 3.0 |

In all cases the addition of the hydrolyzed polyacrylamide to the water prevented the formation of deposits which adhered strongly to the autoclave. The deposits formed from the pretreated waters were loose, amorphous and readily movable. In the control test deposits were firmly adherent to the walls and bottom.

Example 9

The alkaline-lime-cyanide solutions obtained in the cyanidation of a Philippine gold ore were removed from the ore and treated with 0.32 lb. zinc dust per ton to precipitate the gold which was recovered by filtration. Because of the formation of finely-divided deposits of calcium salts on the filter cloths, filters tended to clog and it was necessary to stop the operation twice per week to permit acid washing of the filters to dissolve these deposits. The addition of 2 p.p.m. of the hydrolyzed polyacrylamide product described in Example 4 prior to the filtration operation inhibited the formation of the deposits of calcium salts. Acid washing of the filters was reduced to once per month, thus reducing down time of the filters and maintenance costs by about 87%. Gold losses were also reduced by the use of the hydrolyzed polyacrylamide from 3.5 cents per ton to 2.5 cents per ton.

Example 10

The concentrate obtained in the flotation of a copper ore was settled in a thickener by the use of 2.0 lb. lime/ton. The alkaline underflow from the thickener was filtered for shipment to smelting operations. A deposit of lime salts built up and clogged the filter such that weekly shutdowns were required to permit acid washing of the filters to remove the deposits. The addition of 1.5 p.p.m. of the potassium salt of a hydrolyzed polyacrylamide of about 6,000 molecular weight, containing 70% carboxyl as acrylic acid, to the thickener underflow eliminated the deposition of lime salts and permitted continuous operation of the filters without shutdown for cleanouts.

Example 11

A South American copper ore containing about 2% Cu was ground to minus 65 mesh, conditioned with 4.0 lb./ton sulfuric acid, 0.15 lb./ton cresylic acid as frother, and 0.1 lb./ton sodium diethylmonothiophosphate as collector and floated for 7 minutes. In the resulting concentrate assaying 23.42% Cu, 84.1% of the total copper was recovered. The copper and iron contents of water in which the ore was suspended during the flotation operation were 360 p.p.m. copper and 110 p.p.m. iron and served as interferences during the concentration of copper by flotation.

The ore was similarly treated except that 5 p.p.m. of the sodium salt of hydrolyzed polyacrylamide (molecular weight=6,000; 75% hydrolyzed) were added following the sulfuric acid and before the addition of the cresylic acid and monothiophosphate collector. The use of the hydrolyzed polyacrylamide and subsequent flotation for 7 minutes improved the copper recovery to 89.3% in a concentrate assaying 28.76% Cu.

Example 12

A copper ore containing about 1.2% Cu in an alkaline gangue consisting of calcium and magnesium carbonates and some calcium phosphate is wet ground to about 5% plus 65 mesh. Lime and magnesium salts are dissolved during the grinding in sufficient quantity to interfere with flotation so that only 79.3% of the copper in a concentrate assaying 25.12% Cu is recovered by the use of 0.1 lb./ton amyl xanthate and 0.045 lb./ton of a higher alcohol frother.

The addition of 10 p.p.m. of the hydrolyzed polyacrylamide, 70% carboxylated as described in Example 2, eliminates the interference of the dissolved salts. Subsequent flotation with the xanthate-higher alcohol combination gives a copper recovery of 85.6% in a concentrate assaying 28.47% Cu.

Example 13

The concentrate obtained in the flotation of a copper ore was settled in a thickener by the use of 2.0 lb. lime/ton. The alkaline underflow from the thickener was filtered for shipment to smelting operations. A deposit of lime salts built up and clogged the filter to the extent that weekly shutdowns are required to permit acid washing of the filters to remove the deposits. The addition of 1.5 p.p.m. of sodium salt of the 80% hydrolyzed polyacrylamide to the thickener underflow eliminated the deposition of lime salts and permitted continuous operation of the filters without shutdown for cleanouts over periods of at least thirty days.

Example 14

The following controlled experiments demonstrate the efficiency of the hydrolyzed polyacrylamides herein described in the treatment and utilization of hard waters containing suspended solids such as clay, silts, ore and mineral fines, etc.

The test apparatus consisted of a heating block capable of holding six copper specimens which act as the heat transfer surface. The specimens were polished and weighed before and after a trial run. The heating block was maintained at a temperature of 100° C.±2° C. The circulating water temperature was held at 40–45° C. by means of a stainless steel cooling coil introduced into the cooling water sump. The cooling water being tested was circulated over the copper specimens through a plastic head. The flow velocity along a radius of the test sample ranged from 5 feet per second at the center to 0.5 feet per second at the circumference.

The composition of test solution is given in the following table:

| | P.p.m. |
|---|---|
| $CaCl_2$ to give Ca as $CaCO_3$ | 700 |
| $MgCl_2$ to give Mg as $CaCO_3$ | 200 |
| Total Hardness as $CaCO_3$ | 900 |
| M. O. Alkalinity as $CaCO$ | 20 |
| NaCl to give Cl as Cl | 500 |
| $Na_2SO_4$ to give $SO_4$ as $SO_4$ | 500 |
| $CuSO_4$ to give Cu as Cu | 0.2 |
| $FeSO_4$ to give Fe as Fe | 0.2 |
| $NaHCO_3$ as $CaCO_3$ | 460 |

PH adjusted to 8.0.

The effect of adding varying quantities of a hydrolyzed polyacrylamide (with about 54% of the amide groups hydrolyzed to COONa groups) to the above solution containing 500 p.p.m. kaolin clay is shown in the following table. The weights of deposits are those found on the copper specimens after 20 hours of continuous operation.

Test solution (pH=8.0)—500 p.p.m. clay

| Concentration (p.p.m.) of hydrolyzed polyacrylamide: | Weight (mg.) of deposit |
|---|---|
| 0 | 40.1 |
| 2 | 7.4 |
| 4 | 5.8 |

Generally similar results were obtained with hydrolyzed polyacrylamides in which 60 to 90% of the amide groups had been hydrolyzed to COONa groups. In contrast, 60 p.p.m. sodium lignin sulfonate are required to get a reduction of about 50% of the weight of the deposit. Modification of crystal size, shape, and texture, as described in the foregoing examples, was evident in the solutions to which the hydrolyzed polyacrylamides had been added.

We claim:
1. A process for the control of hard, adherent scales on the walls of vessels or pipes containing an aqueous system having present therein compounds of alkaline earth metals or iron which comprises:
adding to an aqueous system having present therein alkaline earth metal or iron compounds
a small but effective amount of a polymer selected from polymers which
in the acid form have the formula:

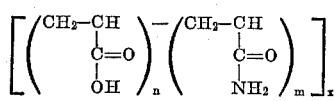

where $n$ and $m$ are whole numbers such that $n$ is at least as large as $m$, and not more than 9 times as large as $m$, and $x$ is a value such that
the molecular weight is about 1,000 to about 8,000 and water soluble salts thereof.

2. A process according to claim 1 in which the polymer has from about 20% to about 40% unhydrolyzed amide groups.
3. A process according to claim 2 in which the molecular weight of the polymer is between 4,000 to 7,000.
4. A process according to claim 1 in which the aqueous solution is ordinary tap water.
5. A process according to claim 2 in which the aqueous solution is ordinary tap water.
6. A process according to claim 3 in which the aqueous solution is ordinary tap water.
7. A process according to claim 1 in which the aqueous system contains alkaline earth metals compounds.
8. A process for the inhibition of formations of hard adherent scales on the walls of steel pipes or vessels from solutions containing alkaline earth metals compounds and in which solutions are suspended silts or sediment particles, comprising adding a small but effective amount of the polymer of claim 1.
9. The process of claim 8 in which the alkaline earth metal compound is predominantly calcium as a carbonate.
10. A process for causing calcium carbonate to precipitate out from an aqueous system as a soft fluffy precipitate which comprises adding to the aqueous system a small but effective amount of the polymer defined in claim 9 as its sodium salt while said system is substantially free from insoluble calcium salts, then modifying the system so that calcium carbonate is precipitated out as a soft non-adherent precipitate.
11. The process of claim 10 in which the precipitation of calcium carbonate is induced by the increase in temperature and volatilization of part of the water from the system.
12. The process of claim 10 in which the precipitation of calcium carbonate is induced by the increase in concentration of the carbonate ion.
13. The process of claim 11 in which the said polymer is present at a concentration between about ¼ and 100 parts per million.
14. The process of claim 12 in which the said polymer is present at a concentration between about ¼ and 100 parts per million.
15. A process for the control of hard, adherent scale of alkaline earth metal salts selected from the group consisting of calcium sulfate and barium sulfate on the walls of vessels or pipes containing aqueous systems having present therein sulfate ions and alkaline earth metal ions selected from the group consisting of calcium ions and barium ions, comprising:
adding to an aqueous system having present therein sulfate ions and alkaline earth metal ions selected from the group consisting of calcium ions and barium ions
from ¼ to 100 parts per million of a polymer selected from polymers which in the acid form have the formula:

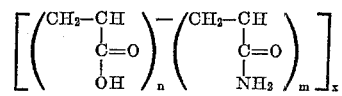

where $n$ and $m$ are whole numbers such that $n$ is at least as large as $m$, and not more than 9 times as large as $m$, and $x$ is a value such that
the molecular weight is about 1,000 to about 8,000 and water soluble salts thereof,
said calcium ions or barium ions and sulfate ions being present in scale forming quantities, under scale forming conditions,
whereby the calcium sulfate or barium sulfate is caused to partially remain in solution, and partially precipitate out in soft readily removable form.

References Cited
UNITED STATES PATENTS

| | | | |
|---|---|---|---|
| 2,327,302 | 8/1943 | Dittmar | 252—180 |
| 2,783,200 | 2/1957 | Crum et al. | 252—180 |
| 2,820,777 | 1/1958 | Suen et al. | 260—89.7 |
| 2,980,610 | 4/1961 | Ruehrwein | 252—180 |
| 3,022,279 | 2/1962 | Proffitt | 260—89.7 |
| 3,215,680 | 11/1965 | Kolodny | 252—180 |

LEON D. ROSDOL, Primary Examiner

W. E. SCHULZ, Assistant Examiner

U.S. Cl. X.R.

210—54; 252—86, 180

UNITED STATES PATENT OFFICE
CERTIFICATE OF CORRECTION

Patent No. 3,463,730      Dated August 26, 1969

Inventor(s) ROBERT BEN BOOTH & LINDA CLARENDON MEAD

It is certified that error appears in the above-identified patent and that said Letters Patent are hereby corrected as shown below:

Col. 10, line 50 change "PARTS PER MINUTE" to read -- P.p.m. --

Col. 1, line 55 change "teaching" to read -- reaching --.

Signed and sealed this 19th day of October 1971.

(SEAL)
Attest:

EDWARD M. FLETCHER, JR.　　　　　ROBERT GOTTSCHALK
Attesting Officer　　　　　　　　Acting Commissioner of Patents